United States Patent [19]

McGrath

[11] Patent Number: 5,099,559
[45] Date of Patent: Mar. 31, 1992

[54] ROLLER ASSEMBLY WITH RELATIVE TOLERANCE MOUNTINGS

[75] Inventor: Vincent J. McGrath, Auckland, New Zealand

[73] Assignee: McGrath Industries Limited, Auckland, New Zealand

[21] Appl. No.: 411,366

[22] Filed: Sep. 25, 1989

[51] Int. Cl.$^5$ .............................................. B21B 13/02
[52] U.S. Cl. ................................ 29/116.1; 29/898.07
[58] Field of Search ................... 29/116.1, 123, 124, 29/125, 130, 895.2, 398.07; 72/247; 384/208

[56] References Cited

U.S. PATENT DOCUMENTS

| | | | |
|---|---|---|---|
| 2,636,221 | 4/1953 | Meadows et al. | 29/116.1 |
| 2,731,678 | 1/1956 | Hopkins | 29/116.1 |
| 3,061,386 | 10/1962 | Dix et al. | 29/898.07 X |
| 3,793,689 | 2/1974 | Specth | 29/116.1 |
| 3,803,682 | 4/1974 | Stein | 29/116.1 |
| 4,852,230 | 8/1989 | Yu | 29/116.1 X |

*Primary Examiner*—Joseph M. Gorski
*Assistant Examiner*—Peter Dungba Vo
*Attorney, Agent, or Firm*—Fleit, Jacobson, Cohn, Price, Holman & Stern

[57] ABSTRACT

A roller comprises an axle (2), a pair of inner collars (3) one adjacent each end of the axle, a bearing (4, 5) mounted on each inner collar (3), an outer collar (6) mounted on each bearing, and a cylindrical member (7) mounted on and spanning the outer collars. The fit of the inner collar (3) onto the axle (2) is relatively loose or of high tolerance, relative to the fit of the collars (3, 6) onto the bearing (4, 5). Preferably the inner collars (3) are rebated (22), so that parts of the inner collar remain substantially clear of the axle (2).

17 Claims, 2 Drawing Sheets

ROLLER ASSEMBLY WITH RELATIVE TOLERANCE MOUNTINGS

FIELD OF THE INVENTION

This invention relates to rollers and is intended particularly though not solely for use in conveyors.

It is an object of the invention to provide a roller.

According, the invention consists in a roller including:

an axle;

a pair of inner collars placed one adjacent each end of said axle;

a bearing mounted on each inner collar;

an outer collar mounted on each bearing; and a cylindrical member placed on and spanning said outer collars, the fit of said inner collar onto said axle being relatively loose or having high tolerance, relative to the fit of said inner and outer collars onto said bearing.

In a further aspect the invention consists in a method of assembling a roller including the steps of:

providing a pair of outer collars having at least part of an inner face thereof formed to a low tolerance;

mounting a substantially cylindrical member on and spanning said pair of outer collars;

mounting a bearing within each outer collar so that said low tolerance part of one of said outer collars is positioned on each bearing; and providing a pair of inner collars having at least part of an outer face thereof formed to a low tolerance;

positioning inner collars so that each said bearing is positioned on said low tolerance part of one of said inner collars and;

passing an axle through said inner collars so that said inner collars are fitted relatively loosely or to a high tolerance about said axle.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWINGS

One preferred form of the invention will now be described with reference to the accompanying drawings wherein.

DETAILED DESCRIPTION

Figure 1:
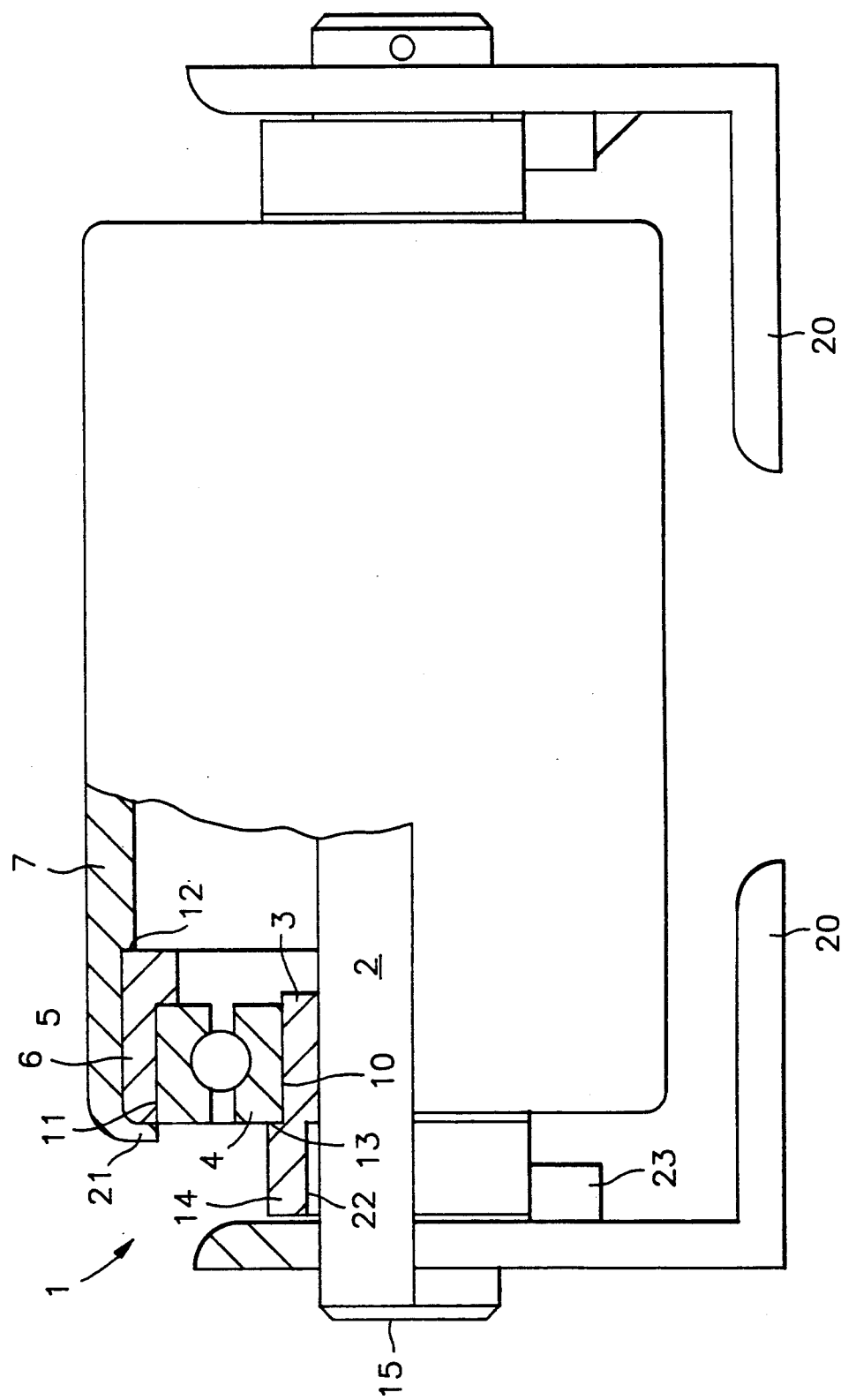
FIG. 1 shows an elevational and partially cross-sectional view of a roller assembly according to at least the preferred form of the invention.
Figure 4:
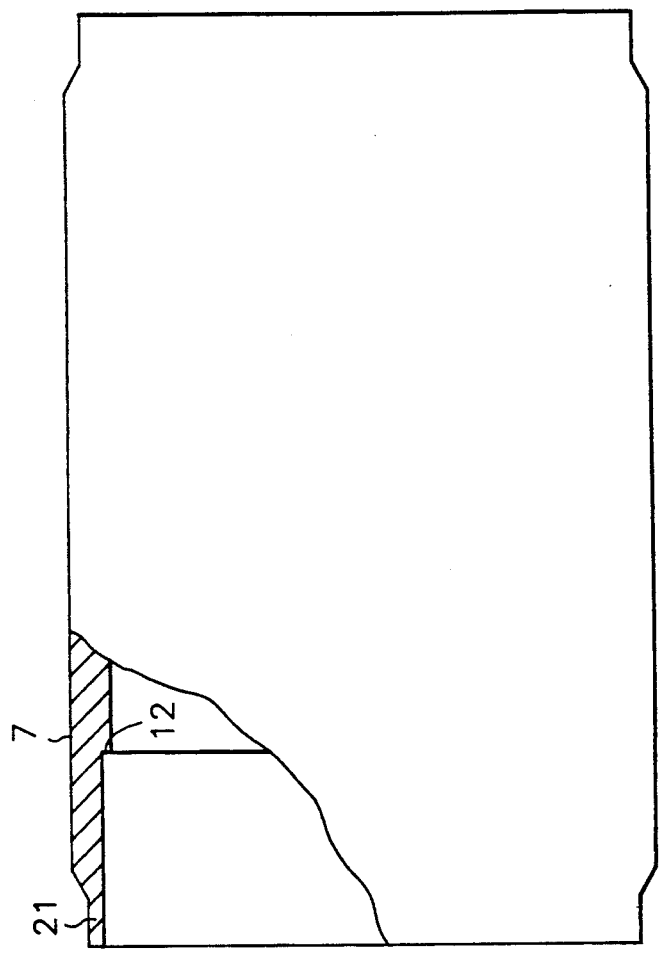
FIGS. 2 to 5 show partially cross-sectional views of one preferred form of, respectively, the inner collar, outer collar, cylindrical (roller) member, and axle components of the roller assembly of FIG. 1.
Figure 3:
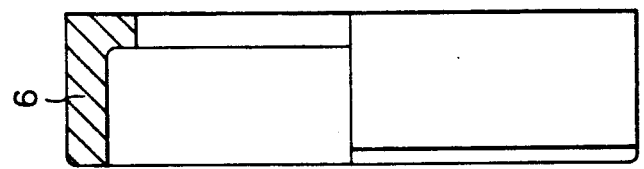
Figure 2:
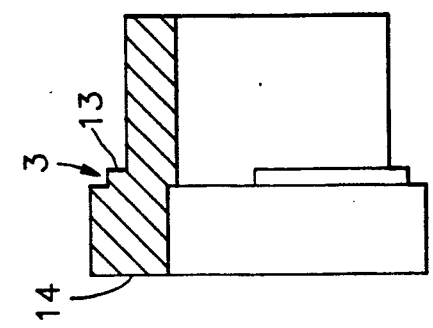
Figure 5:
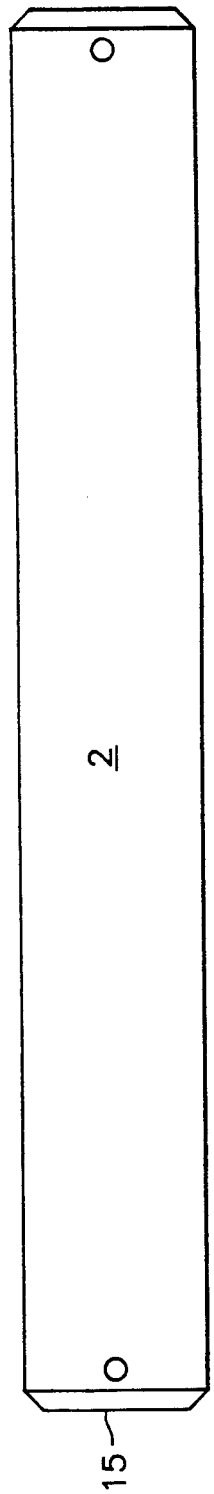

Referring now to the Figures, according to the invention a roller 1 (FIG. 1) is provided comprising an axle 2 (FIG. 5), a pair of inner collars 3 (FIG. 2) placed one adjacent each end of the axle 2, a bearing 4, 5 mounted on each inner collar 3, an outer collar 6 (FIG. 3) mounted on each bearing 4, 5, and a cylindrical member 7 (FIG. 4) placed on and spanning the pair of outer collars 6 (one only shown in FIG. 1). The contact faces (at 10) of the bearing 4, 5 and the inner collar 3, and the contact faces (at 11) of the bearing 4, 5 and the outer collar 6, are formed to give a relatively low tolerance fit.

The inner collars 3 and the outer collars 6 are preferably rebated on opposite hands, the rebate 12 on the outer collar 6 being positioned inwardly of the bearing 4, 5 and serving to retain the bearing 4, 5 against inward movement in use. The rebate 13 on the inner collar 3 is positioned outwardly of the bearing 4, 5 and serves to retain the bearing 4, 5 against outward movement in use.

The bearing 4, 5 suitably comprises an inner race 4 and an outer race 5, the races 4, 5 retaining a plurality of roller members which may be of ball or cylindrical form (not shown).

The inner collar 3 is preferably loosely fitted about the axle 2 on which it is placed. For example, approximately a one millimeter clearance may be provided in the fit between the inner collar 3 and the axle 2. The tolerance of the inner collar 3 on the axle 2 is, for example, a tolerance of h6 as defined in the SKF Manual of Fits and Tolerances. The tolerance of fit between the outer collar 6 and the cylindrical member 7 is for example the same. However, the tolerances of fit between the bearing 4, 5 and the collars 3, 6 are substantially more precise, as required by trade practice, for example P7 as defined in the SKF Manual.

Parts 14 of the inner collar 3 which when assembled are proximal the outer ends 15 of the axle 2, are preferably substantially clear of the axle 2, providing a relief 22. This results in localization of the load pressure between the axle 2 and the inner collar 3 to the area directly radially inward of the bearing 4, 5. This localization of pressure of loading has the effect of substantially reducing or minimizing destructive twisting of the inner race 4 in relation to the outer race 5 arising from deflection of the axle under load or due to bending in the axle when fitted. Thus, damage to the precision bearing is reduced, and a less precise (and therefore cheaper) axle shaft can be used, for example a round mild steel shaft instead of the Bright mild steel shaft which would be expected to be necessary.

The inner collar 3 is preferably of hexagonal or square section, which enables a flat side to be presented to a stop 23 welded to or formed on the frame 20. This stop 23 substantially prevents the inner collar 3 from turning on the loose fitting axle 2, thus preventing or reducing "fretting" in the localized pressure area.

The outer collar 6 may be retained within the cylindrical member 7 by shaping of the outer edge 21 of the cylindrical member 7 to form a rebate external of and retaining the outer collar 6.

The roller assembly 1 is suitably mounted for use on stand means 20, such as on the stringers of a conveyor frame together with a plurality of other rollers.

The roller 1 according to the invention may be constructed of steel or of other suitable materials offering the necessary durability and strength.

The use of the invention will now be described.

In use, the roller 1 is assembled by; firstly, fitting together the outer collars 6 and the cylindrical member 7, and preferably locking these elements together either by spin rivetting or by press swaging at each end of the cylindrical member 7. The swaging can bend down the end 21 of the cylindrical member 7 so as to form a rebate retaining the outer collar 6.

The bearing races 4 and 5 are then fitted inside each outer collar 6 at each end of the roller, followed by fitting of the inner collars 3 at each end. Finally the roller is fitted to the frame 20 by passing the axle 2 through the assembly.

In use a plurality of such rollers are suitably assembled and positioned to form a conveyor. An object, which may be of considerable weight, may be moved along such a conveyor as the rollers rotate. The rotation of the rollers is facilitated by the bearing 4, 5, the outer race 5 being displaced on the ball or roller members (not shown) contained within the race and thus rotating with respect to the inner race 4, the inner collar 3 and the axle 2. Due to the high precision or lower tolerance fit between the contact surfaces 10, 11 of the collars and the bearing, fretting which can result in undesirable wear of the bearing assembly is minimized. It is also an advantage of the invention that the inner and outer collars 3 and 6, have low tolerance contact faces to receive the bearing but do not give a highly precise fit onto the surfaces contacting the axle 2 and cylindrical member 7 respectively. This enables the axle 2 and cylindrical member 7 to be made to a high tolerance (low precision) fit without risk of damaging the high precision bearing assembly.

It is a further advantage of the apparatus of the invention that the shaping of the inner collar and configuration relative to the axle and stop are such as to localize loading in the area of the high precision bearing, and also to reduce "fretting".

Thus it can be seen that a roller assembly employing a high precision bearing is provided by the invention which is of relatively simple construction, but which can serve to provide high precision rolling, with many of the components being made only to a low precision which is cheaper to manufacture. Since a high precision bearing can be used, the load of an otherwise low precision roller can be greatly increased according to the invention.

I claim:
1. A roller comprising:
    an axle having outer ends;
    a pair of inner collars mounted on said axle with a relatively high tolerance between said inner collars and said axle, one of said inner collars being adjacent each end of said axle;
    a bearing mounted on each inner collar with a relatively low tolerance between each inner collar and the respective bearing;
    an outer collar mounted on each bearing with a relatively low tolerance between each outer collar and the respective bearing; and
    a cylindrical member mounted on and spanning said outer collars;
    said tolerance between each inner collar and said axle being relatively high relative to said tolerance between each inner collar and the respective bearing and between each outer collar and the respective bearing.
2. A roller as claimed in claim 1 wherein the region of contact between each inner collar and said axle is substantially limited to surfaces radially inward from said bearings.
3. A roller as claimed in claim 1 wherein said tolerance between said cylindrical member and each outer collar is relatively high relative to said tolerance between each outer collar and the respective bearing and between each inner collar and the respective bearing.
4. A roller as claimed in claim 1 wherein:
    a clearance of substantially 1 mm is provided between said axle and inner collar.
5. A roller as claimed in claim 1 wherein each outer collar is retained on said roller by a rebate on said cylindrical member.
6. A roller as claimed in claim 5 wherein:
    said cylindrical member has ends proximal said outer ends of said axle; and
    said rebate comprises a radially inwardly projecting shoulder on said cylindrical member adjacent each end thereof providing a surface facing axially outwardly in the direction of the proximal end of said axle;
    said cylindrical member being mounted on said outer collars with said shoulders thereon in abutting relationship with said outer collars.
7. A roller as claimed in claim 1 wherein said inner collar and said outer collar on each bearing are rebated on opposite hands.
8. A roller as claimed in claim 7 wherein said rebates on opposite hands comprise:
    a radially inwardly projecting shoulder on each outer collar providing an abutment surface facing axially outwardly in the direction of the adjacent end of said axle; and
    a radially outwardly projecting shoulder on each inner collar providing an abutment surface facing oppositely to said abutment surface on said outer collar on the same bearing;
    said bearings being mounted on said collars in abutting relationship with said shoulders.
9. A roller as claimed in claim 8 wherein:
    said cylindrical member has ends proximal said outer ends of said axle; and
    said rebate comprises a radially inwardly projecting shoulder on said cylindrical member adjacent each end thereof providing a surface facing axially outwardly in the direction of the proximal end of said axle;
    said cylindrical member being mounted on said outer collars with said shoulders thereon in abutting relationship with said outer collars.
10. A roller as claimed in claim 1 wherein parts of each inner collar proximal each outer end of said axle is substantially clear of said axle.
11. A roller as claimed in claim 10 wherein:
    each inner collar has an axially outer portion of sufficient axial length and sufficient clearance between said outer portion and said axle so that contact between said inner collar and said axle is limited to surfaces substantially radially inwardly of the respective bearing.
12. A roller as claimed in claim 11 wherein said inner collar and said outer collar on each bearing are rebated on opposite hands.
13. A roller as claimed in claim 12 wherein said rebates on opposite hands comprise:
    a radially inwardly projecting shoulder on each outer collar providing an abutment surface facing axially outwardly in the direction of the adjacent end of said axle; and
    a radially outwardly projecting shoulder on each inner collar providing an abutment surface facing oppositely to said abutment surface on said outer collar on the same bearing;
    said bearings being mounted on said collars in abutting relationship with said shoulders.

14. A roller as claimed in claim 12 wherein rebates are provided on said cylindrical member providing shoulders abutting said outer collars.

15. A roller as claimed in claim 14 wherein:
said cylindrical member has ends proximal said outer ends of said axle; and
each rebate comprises a radially inwardly projecting shoulder on said cylindrical member adjacent each end thereof providing a surface facing axially outwardly in the direction of the proximal end of said axle;
said cylindrical member being mounted on said outer collars with said shoulders thereon in abutting relationship with said outer collars.

16. A roller as claimed in claim 14 wherein said tolerance between said cylindrical member and each outer collar is relatively high relative to said tolerance between each outer collar and the respective bearing and between each inner collar and the respective bearing.

17. A roller as claimed in claim 16 wherein:
a clearance of substantially 1 mm is provided between said axle and inner collar.

* * * * *